United States Patent
Walton

(10) Patent No.: US 8,620,928 B1
(45) Date of Patent: Dec. 31, 2013

(54) AUTOMATICALLY GENERATING A LOG PARSER GIVEN A SAMPLE LOG

(75) Inventor: Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/549,620

(22) Filed: Jul. 16, 2012

(51) Int. Cl.
*G06F 17/30* (2006.01)

(52) U.S. Cl.
USPC .......................................................... 707/748

(58) Field of Classification Search
USPC .......................................................... 707/748
See application file for complete search history.

(56) References Cited

U.S. PATENT DOCUMENTS

| | | | |
|---|---|---|---|
| 6,850,950 B1 | 2/2005 | Clarke et al. | |
| 7,047,288 B2 | 5/2006 | Cooper et al. | |
| 7,437,359 B2 | 10/2008 | Aguilar-Macias et al. | |
| 7,653,633 B2 | 1/2010 | Villella et al. | |
| 8,341,081 B1 * | 12/2012 | Wang et al. | 705/39 |
| 2007/0239671 A1 * | 10/2007 | Whitman et al. | 707/2 |
| 2009/0119307 A1 | 5/2009 | Braun et al. | |

OTHER PUBLICATIONS

App: Automatic parser [online], [Retrieved on Apr. 12, 2012]. Retrieved from the Internet: < URL: http://eco.netvibes.com/apps/231389/automatic-parser>, 3 pages.

Doctorow, Automatically generate regular expressions with Txt2re [online], [Retrieved on Apr. 12, 2012]. Retrieved from the Internet: <URL: http://boingboing.net/2011/04/14/automatically-genera. html>, 3 pages.

API for Automatic Parser Creation [online] boost c + + Libraries, [Retrieved on Apr. 12, 2012]. Retrieved from the Internet: < URL: http://www.boost.org/doc/libs/1_47_0/libs/spirit/doc/html/spirit/qi/reference/parse_api/create_parser. html>, 2 pages.

Brill, Automatic Grammar Induction and Parsing Free Text: A Transformation-Based Approach, Proceedings of the 31st Annual Meeting of the Association for Computational Linguistics, 1993, pp. 259-265.

Dube et al., Efficiently building a parse tree from a regular expression, ACTA Informatica vol. 37 No. 2, Springer-Verlag, 2000, 20 pages.

Adding automatic parsing of regexps [online], [Retrieved on Apr. 12, 2012]. Retrieved from the Internet: < URL: http://groups.google.com/group/hampi-devel/browse_thread/thread/e1e728d373b8365c?pli=1>, 2 pages.

(Continued)

*Primary Examiner* — Pierre Vital
*Assistant Examiner* — Courtney Harmon
(74) *Attorney, Agent, or Firm* — Schmeiser, Olsen & Watts; Mark Vallone

(57) ABSTRACT

An approach is presented for generating a log parser. A tokenized log comprising elements is generated by delimiting a sample log based on a token. Matches between elements and attributes of fields of the sample log are determined. Positions of the matched elements are determined. Based on the matches, a ranking of the token is determined, which indicates a first likelihood that the token is a delimiter that delimits parts of the sample log. Another ranking of another token is determined, which indicates a second likelihood that the other token is the delimiter. A parser is generated based on the positions, the matches and the token. Based on the first likelihood exceeding the second likelihood, a result of parsing the sample log using the parser is presented without presenting another result of parsing the log using another parser based on the other token.

24 Claims, 8 Drawing Sheets

(56) References Cited

OTHER PUBLICATIONS

Franklin, et al., Assisting Network Instrusion Detection with Reconfigurable Hardware, IEEE Symposium on Field-Programmable Custom Computing Machines 2002, 11 pages.

Balzer et al., Memorandumrm-5611-1-ARPA, Sep. 1969 Aparel: -A Parse-Request Langauge, ip.com, Ip.com No. IPCOM000128848D,Original Publication Date: Sep. 1, 1969, ip.com Electronic Publication: Sep. 19, 2005, 16 pages.

IBM, Method and System for Scoring/Ranking During Log Type Determination, ip.com, May 2009, IP.com No. IPCOM000183403D, 4 pages.

U.S. Appl. No. 13/449,531, filed Apr. 18, 2012, First Named Inventor: Brian M. Anderson, Confirmation No. 6352.

\* cited by examiner

AUTOMATICALLY GENERATING A LOG PARSER GIVEN A SAMPLE LOG

TECHNICAL FIELD

The present invention relates to a data processing method and system for managing computer data logs, and more particularly to a technique for automatically generating a log parser.

BACKGROUND

A log parser is a set of regular expressions that are used to parse each line of a particular type of log file (i.e., a computer file that includes a computer data log). The log file may include, for example, a record of system activity events (e.g., login, login failed, logout, and password changed). In currently used techniques for generating log parsers, a user manually writes regular expressions for a log parser using a known interface. The known interface applies each manually written regular expression to a log file and presents information that allows the user to determine whether or not the regular expression is effective.

SUMMARY

In first embodiments, the present invention provides a method of generating a log parser. The method includes a computer receiving a sample log whose parts are delimited by one or more occurrences of a delimiter in the sample log. The method further includes the computer retrieving a plurality of tokens. The method further includes the computer generating a tokenized log by delimiting the received sample log based on a token included in the retrieved plurality of tokens, the tokenized log comprising a plurality of elements, each element delimited in the tokenized log by the token. The method further includes the computer determining one or more matches between respective one or more elements in the plurality of elements and respective one or more attributes, each attribute being an attribute of a field included in one or more fields of the sample log. The method further includes, based on the one or more matches and based on the token, the computer determining one or more positions of the respective one or more elements within the tokenized log. The method further includes, based on the one or more matches, the computer determining a ranking of the token, the ranking indicating a first likelihood that the token is the delimiter that delimits the parts of the sample log. The method further includes the computer determining a second ranking of another token included in the retrieved plurality of tokens, the second ranking indicating a second likelihood that the other token is the delimiter. The method further includes the computer determining the first likelihood is greater than the second likelihood. The method further includes, based on the one or more positions, the one or more matches, and the token, the computer generating a first parser by generating one or more parser patterns for the one or more matches, respectively. The method further includes the computer generating a second parser based in part on the other token. The method further includes the computer parsing the sample log based on the generated first parser. The method further includes, based on the first likelihood being greater than the second likelihood, the computer presenting a result of the step of parsing the sample log and the computer receiving a validation of the presented result without the computer presenting another result of parsing the sample log based on the second parser.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of generating a log parser. The method includes the computer system receiving a sample log whose parts are delimited by one or more occurrences of a delimiter in the sample log. The method further includes the computer system retrieving a plurality of tokens. The method further includes the computer system generating a tokenized log by delimiting the received sample log based on a token included in the retrieved plurality of tokens, the tokenized log comprising a plurality of elements, each element delimited in the tokenized log by the token. The method further includes the computer system determining one or more matches between respective one or more elements in the plurality of elements and respective one or more attributes, each attribute being an attribute of a field included in one or more fields of the sample log. The method further includes, based on the one or more matches and based on the token, the computer system determining one or more positions of the respective one or more elements within the tokenized log. The method further includes, based on the one or more matches, the computer system determining a ranking of the token, the ranking indicating a first likelihood that the token is the delimiter that delimits the parts of the sample log. The method further includes the computer system determining a second ranking of another token included in the retrieved plurality of tokens, the second ranking indicating a second likelihood that the other token is the delimiter. The method further includes the computer system determining the first likelihood is greater than the second likelihood. The method further includes, based on the one or more positions, the one or more matches, and the token, the computer system generating a first parser by generating one or more parser patterns for the one or more matches, respectively. The method further includes the computer system generating a second parser based in part on the other token. The method further includes the computer system parsing the sample log based on the generated first parser. The method further includes, based on the first likelihood being greater than the second likelihood, the computer system presenting a result of the step of parsing the sample log and the computer system receiving a validation of the presented result without the computer system presenting another result of parsing the sample log based on the second parser.

In third embodiments, the present invention provides a computer program product including a computer-readable, tangible storage device and computer-readable program instructions stored in the computer-readable, tangible storage device. The computer-readable program instructions, when carried out by a central processing unit (CPU) of a computer system, implement a method of generating a custom log parser. The method includes the computer system receiving a sample log whose parts are delimited by one or more occurrences of a delimiter in the sample log. The method further includes the computer system retrieving a plurality of tokens. The method further includes the computer system generating a tokenized log by delimiting the received sample log based on a token included in the retrieved plurality of tokens, the tokenized log comprising a plurality of elements, each element delimited in the tokenized log by the token. The method further includes the computer system determining one or more matches between respective one or more elements in the plurality of elements and respective one or more attributes, each attribute being an attribute of a field included in one or more fields of the sample log. The method further includes, based on the one or more matches and based on the token, the computer system determining one or more positions of the respective one or more elements within the tokenized log. The method further includes, based on the one or more matches, the computer system determining a ranking of the token, the ranking indicating a first likelihood that the token is the delimiter that delimits the parts of the sample log. The method further includes the computer system determining a second ranking of another token included in the retrieved plurality of tokens, the second ranking indicating a second likelihood that the other token is the delimiter. The method further includes the computer system determining the first likelihood is greater than the second likelihood. The method further includes, based on the one or more positions, the one or more matches, and the token, the computer system generating a first parser by generating one or more parser patterns for the one or more matches, respectively. The method further includes the computer system generating a second parser based in part on the other token. The method further includes the computer system parsing the sample log based on the generated first parser. The method further includes, based on the first likelihood being greater than the second likelihood, the computer system presenting a result of the step of parsing the sample log and the computer system receiving a validation of the presented result without the computer system presenting another result of parsing the sample log based on the second parser.

In fourth embodiments, the present invention provides a process for supporting computing infrastructure. The process includes a first computer system providing at least one support service for at least one of creating, integrating, hosting, maintaining, and deploying computer-readable code in a second computer system. The computer-readable code contains instructions. The instructions, when carried out by a processor of the second computer system, implement a method of generating a log parser. The method includes the second computer system receiving a sample log whose parts are delimited by one or more occurrences of a delimiter in the sample log. The method further includes the second computer system retrieving a plurality of tokens. The method further includes the second computer system generating a tokenized log by delimiting the received sample log based on a token included in the retrieved plurality of tokens, the tokenized log comprising a plurality of elements, each element delimited in the tokenized log by the token. The method further includes the second computer system determining one or more matches between respective one or more elements in the plurality of elements and respective one or more attributes, each attribute being an attribute of a field included in one or more fields of the sample log. The method further includes, based on the one or more matches and based on the token, the second computer system determining one or more positions of the respective one or more elements within the tokenized log. The method further includes, based on the one or more matches, the second computer system determining a ranking of the token, the ranking indicating a first likelihood that the token is the delimiter that delimits the parts of the sample log. The method further includes the second computer system determining a second ranking of another token included in the retrieved plurality of tokens, the second ranking indicating a second likelihood that the other token is the delimiter. The method further includes the second computer system determining the first likelihood is greater than the second likelihood. The method further includes, based on the one or more positions, the one or more matches, and the token, the second computer system generating a first parser by generating one or more parser patterns for the one or more matches, respectively. The method further includes the second computer system generating a second parser based in part on the other token. The method further includes the second computer system parsing the sample log based on the generated first parser. The method further includes, based on the first likelihood being greater than the second likelihood, the second computer system presenting a result of the step of parsing the sample log and the second computer system receiving a validation of the presented result without the second computer system presenting another result of parsing the sample log based on the second parser.

Embodiments of the present invention save the user time by automating the generation of log parsers and based on a sample log. Furthermore, embodiments of the present invention determine rankings of tokens that are potential delimiters of the sample log, and utilize the rankings so that a user can validate a parser based on a minimal number of parsing results generated and presented to the user.

DETAILED DESCRIPTION

Overview

Embodiments of the present invention automatically generate a log parser based on a sample log by creating tokenized logs from the sample log; collecting data about elements of each tokenized log and ranking tokens used to create the tokenized logs; based on the collected data, generating parser patterns for timestamps and attributes of fields in the tokenized log; generating results of parsing the sample log using the parsing patterns; and presenting the parsing results for user validation.

System for Generating a Log Parser

Figure 1:
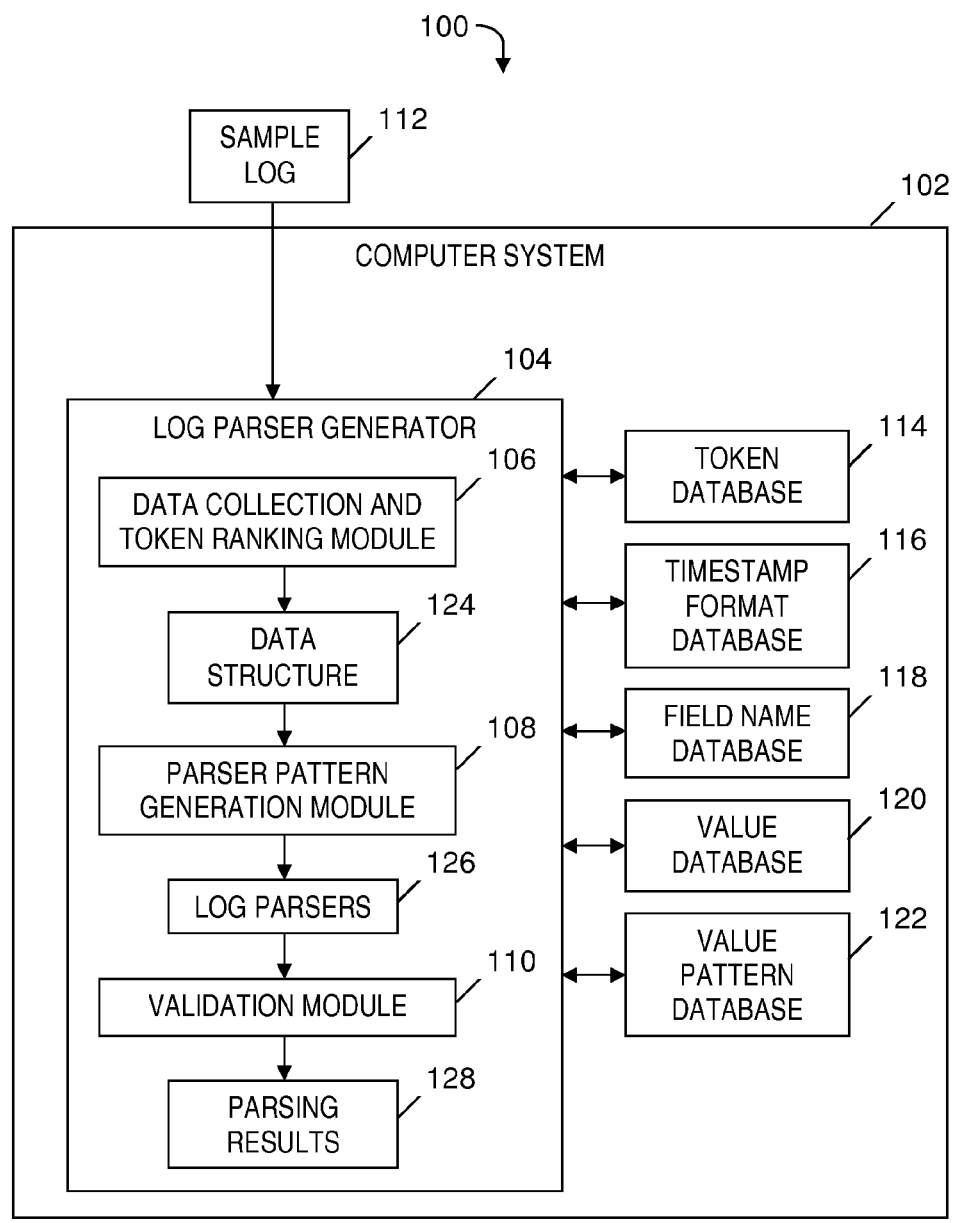
FIG. 1 depicts a block diagram of a system for automatically generating a log parser, in accordance with embodiments of the present invention.

FIG. 1 depicts a block diagram of a system for automatically generating a log parser, in accordance with embodiments of the present invention. System 100 includes a computer system 102 that runs a software-based log parser generator 104, which includes the following software modules: a data collection and token ranking module 106, a parser pattern generation module 108, and a validation module 110.

Log parser generator 104 receives a sample log 112, which may be a computer log file, such as a system activity event log file. Sample log 112 includes a delimiter that delimits parts of the sample log. The delimiter may be, for example, a comma, a space, a tab, or a pipe character. Log parser generator 104 also receives a log type (i.e., a type of the sample log 112) (not shown), which determines the potential field names, potential field values and potential value patterns that specify field values that may be used in sample log 112.

Log parser generator 104 retrieves tokens from a token database 114, timestamp formats from a timestamp format database 116, and names (i.e., field names) of fields that are potentially in sample log 112 from a field name database 118. Further, log parser generator 104 retrieves from a value database 120 potential values of fields in sample log 112. Still further, log parser generator 104 retrieves from a value pattern database 122 potential value patterns specifying patterns of values in fields in sample log 112.

Data collection and token ranking module 106 generates tokenized logs based on tokens retrieved from token database 114. Each tokenized log is the result of utilizing a corresponding retrieved token to delimit parts of sample log 112. By matching elements of a tokenized log to data from timestamp format database 116, filed name database 118, value database 120, and value pattern database 122, data collection and token ranking module 106 determines positions of the matched elements in the tokenized log and determines rankings of the token used to generate the tokenized log. Data collection and token ranking module 106 stores the token, the ranking of the token, matched data from databases 116, 118, 120, and/or 122, and the determined positions in a data structure 124.

Parser pattern generation module 108 retrieves the token, matched data, and positions from data structure 124 to generate parser patterns for matched timestamps, matched field names and/or matched value patterns. Parser pattern generation module 108 optionally utilizes data structure 124 to generate parser patterns for matched field values. Parser pattern generation module 108 creates log parsers 126 from the generated parser patterns. The log parsers 126 are associated with the tokens in a one-to-one correspondence.

Validation module 110 presents to a user parsing results 128, which are the result of parsing sample log 112 with the parser associated with the highest ranked token. If the validation module 110 receives an indication that the parsing results 128 validate the aforementioned parser, then validation module 110 does not present the results of any other parser. If validation module 110 receives an indication that parsing results 128 do not validate the aforementioned parser, then validation module 110 presents the results of parsing sample log 112 using the parser associated with the next highest ranked token. Validation module 110 subsequently receives an indication that the most recently presented results either validate or do not validate the parser associated with the next highest ranked token.

The functionality of the components shown in FIG. 1 is described below in more detail in the discussion of FIGS. 2A-2B, FIG. 3, FIG. 4, FIG. 5 and FIG. 6.

Although databases 114, 116, 118, 120 and 122 are shown in FIG. 1 as a set of five databases, other embodiments replace databases 114, 116, 118, 120 and 122 with a different set of one or more databases that includes the same data included in databases 114, 116, 118, 120 and 122.

Process for Generating a Log Parser

Figure 2A:
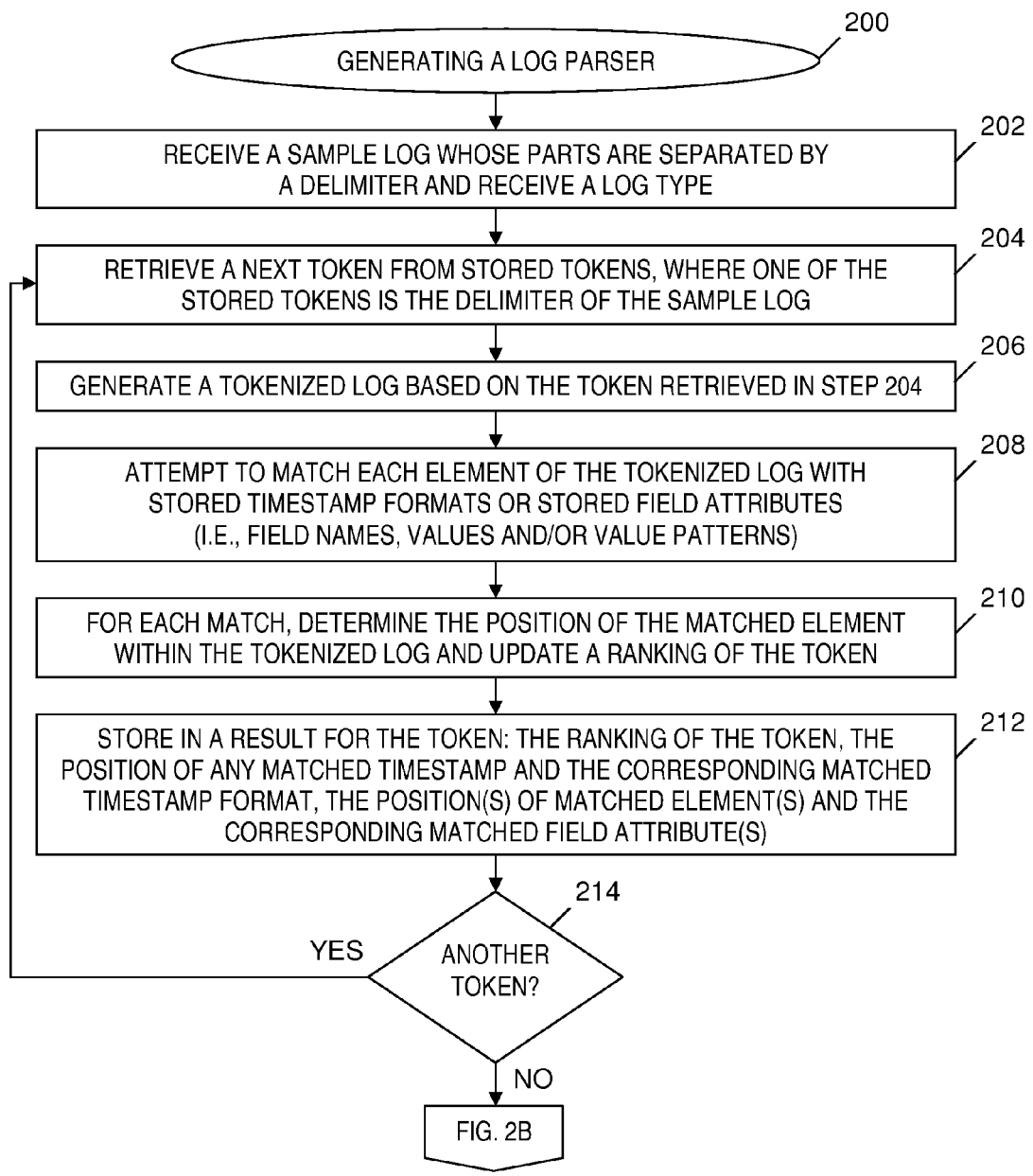
FIGS. 2A-2B depict a flowchart of a process of automatically generating a log parser, where the process is implemented in the system of FIG. 1, in accordance with embodiments of the present invention.
Figure 2B:
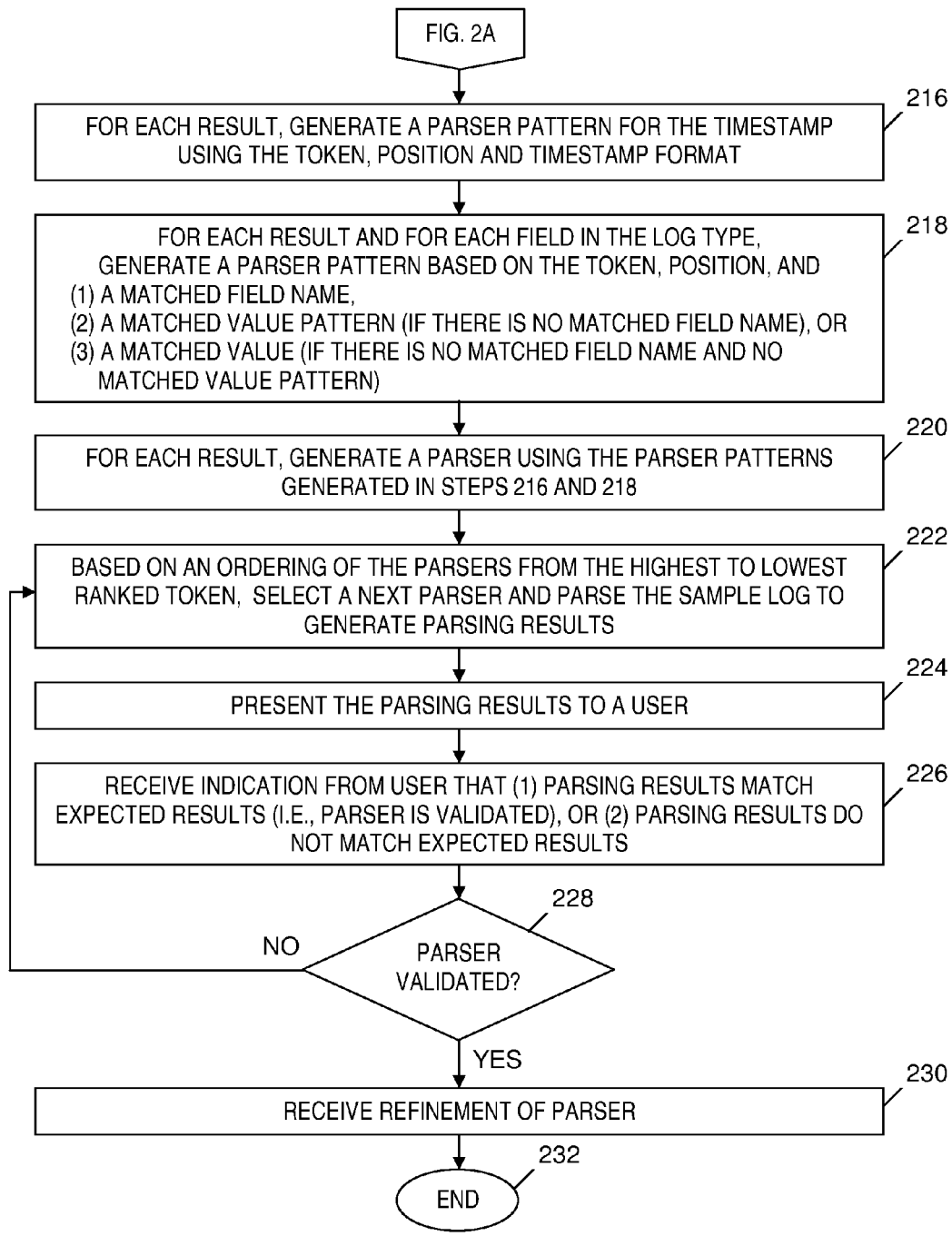

FIGS. 2A-2B depict a flowchart of a process of automatically generating a log parser, where the process is implemented in the system of FIG. 1, in accordance with embodiments of the present invention. The process of generating a log parser starts at step 200. In step 202, log parser generator 104 (see FIG. 1) receives sample log 112 (see FIG. 1) whose parts are delimited by one or more occurrences of a delimiter in sample log 112 (see FIG. 1). Step 202 also includes log parser generator 104 (see FIG. 1) receiving a log type that specifies the type of sample log 112 (see FIG. 1). The log type specifies multiple fields that are potentially included in sample log 112 (see FIG. 1).

In step 204, data collection and token ranking module 106 (see FIG. 1) retrieves a token from token database 114 (see FIG. 1). The token database 114 (see FIG. 1) includes multiple tokens, one of which is the delimiter that separates the parts of sample log 112 (see FIG. 1).

In step 206, data collection and token ranking module 106 (see FIG. 1) generates a tokenized log based on the token retrieved in step 204. The tokenized log is generated in step 206 by separating sample log 112 (see FIG. 1) into portions by using the token retrieved in step 204 as a delimiter of the portions. Hereinafter, in the discussion of FIGS. 2A-2B, the tokenized log generated in step 204 is referred to simply as "the tokenized log."

In step 208, data collection and token ranking module 106 (see FIG. 1) retrieves, one by one, a format of a timestamp (i.e., a timestamp format) (e.g., MM/DD/YYYY HH:MM:SS Z) from timestamp format database 116 (see FIG. 1) and attempts to match a format of an element of the tokenized log with the retrieved timestamp format. The retrieving of the timestamp formats one by one in step 208 continues until data collection and token ranking module 106 (see FIG. 1) determines a match between the format of the element and the retrieved timestamp format (i.e., determines that the element is a timestamp) or until data collection and token ranking module 106 (see FIG. 1) determines that all the timestamp formats in timestamp format database 116 (see FIG. 1) have been retrieved and no match between the format of the element and any of the retrieved timestamp formats has been determined.

As used herein, an element is defined to be a portion of the tokenized log, where the portion is delimited in the tokenized log by a token. For simplicity, matching the format of an element to a timestamp format is also referred to herein as matching an element to a timestamp format.

For each field specified by the log type of sample log 112 (see FIG. 1), in step 208, data collection and token ranking module 106 (see FIG. 1) retrieves a field attribute from database 118, 120 or 122 in FIG. 1. That is, data collection and token ranking module 106 (see FIG. 1) retrieves a field name from field name database 118 (see FIG. 1), a field value from value database 120 (see FIG. 1) or a value pattern from value pattern database 122 (see FIG. 1). Also in step 208, data collection and token ranking module 106 (see FIG. 1) attempts to match the element of the tokenized log with the retrieved field attribute. The attempt to match the element to a field name is described in more detail in the discussion presented below relative to FIG. 4. The attempt to match the element to a field value is described in more detail in the discussion presented below relative to FIG. 5. The attempt to match the element to a value pattern is described in more detail in the discussion presented below relative to FIG. 6.

Step 208 is repeated for one or more other elements in the tokenized log.

In step 210, for each match to a timestamp format determined in step 208, data collection and token ranking module 106 (see FIG. 1) determines a position of the element within the tokenized log and updates a ranking of the token. As used herein, a ranking of a token is defined as a number or other quantitative or qualitative measurement that indicates a likelihood that the token is the delimiter that delimits the parts of a sample log. In one embodiment, a ranking of a token is a non-negative integer, where the greater integer indicates the greater likelihood that the token is the delimiter. For example, if a first token has a ranking of 105 and a second token has a ranking of 27, then the first token is more likely than the second token to be the delimiter in sample log 112 (see FIG. 1) because 105 exceeds 27.

In step 210, for each match to a field attribute determined in step 208, data collection and token ranking module 106 (see FIG. 1) determines a position of the element within the tokenized log and updates the ranking of the token.

The position of the element within the tokenized log is a position relative to a particular occurrence of the token in the tokenized log. In one embodiment, the position determined in step 208 is indicated by a token position (i.e., a number indicating the ordinal position of the token relative to other tokens in a line of the tokenized log). For example, an element having a token position of 2 is positioned immediately after the second token in a line of the tokenized log.

In one embodiment, the ranking of each token is initialized to the same integer prior to step 210 and step 210 includes data collection and token ranking module 106 (see FIG. 1) updating the ranking of the token by incrementing the ranking by one.

In step 212, data collection and token ranking module 106 (see FIG. 1) stores in data structure 124 (see FIG. 1) a result associated with the token. The stored result includes the ranking of the token updated in step 210, the position determined in step 210 of a timestamp in the tokenized log, the timestamp format retrieved in step 208 (i.e., the timestamp format to which the format of the timestamp in the tokenized log was matched in step 208, the position(s) of element(s) in the tokenized log that were matched to field attribute(s) in step 208, and the field attribute(s) to which the element(s) were matched in step 208.

In step 214, if data collection and token ranking module 106 (see FIG. 1) determines there is another token in token database 114 (see FIG. 1) that has yet to be retrieved in step 204, then the Yes branch of step 214 is taken and the process loops back to step 204 with data collection and token ranking module 106 (see FIG. 1) retrieving the next token from token database 114 (see FIG. 1). If data collection and token ranking module 106 (see FIG. 1) determines in step 214 that there is not another token in token database 114 (see FIG. 1) that has yet to be retrieved in step 204, then the No branch of step 214 is taken and the process continues with step 216 in FIG. 2B.

In step 216, for each result stored in data structure 124 (see FIG. 1) in step 212 (see FIG. 2A), parser pattern generation module 108 (see FIG. 1) generates a parser pattern for the timestamp matched to a timestamp format in step 208 (see FIG. 2A). The parser pattern for the timestamp is generated in step 216 by generating a regular expression that utilizes the token, the position of the matched timestamp determined in step 210 (see FIG. 2A), and the timestamp format to which the timestamp was matched in step 208 (see FIG. 2A).

In step 218, for each result stored in data structure 124 (see FIG. 1) in step 212 (see FIG. 2A), and for each field in the log type, parser pattern generation module 108 (see FIG. 1) generates a parser pattern according to the following rules:

Rule 1:

If step 208 (see FIG. 2A) determined that an element in the tokenized log matches (1) a field name in field name database 118 (see FIG. 1) or (2) a variation of a field name in field name database 118 (see FIG. 1), then parser pattern generation module 108 (see FIG. 1) generates a regular expression for the parser associated with the token, where the regular expression uses the token, the position of the matched element determined in step 210 (see FIG. 2A), and the field name or field name variation to which the element was matched in step 208 (see FIG. 2A).

Rule 2:

If step 208 (see FIG. 2A) determined that an element in the tokenized log matches a value pattern in value pattern database 122 (see FIG. 1) and further determined that the element did not match a field name or variation of a field name in field name database 118 (see FIG. 1), then parser pattern generation module 108 (see FIG. 1) generates a regular expression for the parser associated with the token, where the regular expression uses the token, the position of the matched element determined in step 210 (see FIG. 2A), and the value pattern to which the element was matched in step 208 (see FIG. 2A).

Rule 3:

If step 208 (see FIG. 2A) determined that an element in the tokenized log matches a value in value database 120 (see FIG. 1) and further determined that the element did not match a field name or variation of a field name in field name database 118 (see FIG. 1), and still further determined that the element did not match a value pattern in the value pattern database 122 (see FIG. 1), then parser pattern generation module 108 (see FIG. 1) generates a regular expression for the parser associated with the token, where the regular expression uses the token, the position of the matched element determined in step 210 (see FIG. 2A), and the value to which the element was matched in step 208 (see FIG. 2A).

In an alternate embodiment, step 218 includes parser pattern generation module 108 (see FIG. 1) generating a parser pattern by applying Rule 1 and Rule 2, but not Rule 3.

In step 220, for each token and corresponding result stored in data structure 124 (see FIG. 1) in step 212 (see FIG. 2A), parser pattern generation module 108 (see FIG. 1) generates a respective parser in log parsers 126 (see FIG. 1) by including the parser patterns that are associated with the token and that were generated in steps 216 and 218. By including the parser patterns that were generated in steps 216 and 218, the parser generated in step 220 is based on the position(s), the matched timestamp format, the matched field attribute(s) and the token stored in the result in step 212 (see FIG. 2A).

In step 222, based on a ranking-based ordering of the parsers from the parser associated with the token having the highest ranking to the parser associated with the token having the lowest ranking, validation module 110 (see FIG. 1) selects the next parser from log parsers 126 (see FIG. 1) and parses the sample log 112 (see FIG. 1) using the selected parser to generate parsing results 128 (see FIG. 1).

In step 224, validation module 110 (see FIG. 1) presents the parsing results 128 (see FIG. 1) to a user. In one embodiment, step 224 includes validation module 110 (see FIG. 1) initiating a display of a data table that includes the parsing results 128 (see FIG. 1).

Prior to step 226, the user reviews the parsing results 128 (see FIG. 1) presented in step 224 and determines whether the parsing results 128 (see FIG. 1) match results (i.e., expected results) that the user expected for the fields included in sample log 112 (see FIG. 1). If the user determines that parsing results 128 (see FIG. 1) match the expected results, then in step 226, validation module 110 (see FIG. 1) receives an indication from the user that parsing results 128 (see FIG. 1) match the expected results. If the user determines that parsing results 128 (see FIG. 1) do not match the expected results, then in step 226, validation module 110 (see FIG. 1) receives an indication from the user that parsing results 128 (see FIG. 1) do not match the expected results. If validation module 110 (see FIG. 1) receives in step 226 an indication that parsing results 128 (see FIG. 1) match the expected results, then validation module 110 (see FIG. 1) determines in step 228 that the parser is validated, the Yes branch of step 228 is taken and optional step 230 is performed. In optional step 230, log parser generator 104 (see FIG. 1) receives a refinement of the parser from the user. The process of FIGS. 2A-2B ends at step 232.

Returning to step 228, if validation module 110 (see FIG. 1) receives in step 226 an indication that parsing results 128 (see FIG. 1) do not match the expected results, then validation module 110 (see FIG. 1) determines in step 228 that the parser is not validated, the No branch of step 228 is taken and the process loops back to step 222 with validation module 110 (see FIG. 1) selecting the next parser from log parsers 126 (see FIG. 1) according to the aforementioned ranking-based ordering.

A minimal number of parsing results 128 (see FIG. 1) are generated in iterations of step 222 and presented in iterations of step 224 because the parsers that provide the parsing results 128 (see FIG. 1) are selected in step 222 based on the ranking of tokens associated with the parsers. Presenting the parsing result 128 (see FIG. 1) of the first parser associated with a first token in step 224, receiving the indication of the match to the expected results in step 226 and determining the validation of the first parser in step 228 without generating and presenting a result of parsing the sample log 112 (see FIG. 1) using a second parser associated with a second token is based on a ranking of the first token exceeding a ranking of the second token. That is, based on the likelihood that the first token is the delimiter in the sample log 112 (see FIG. 1) is greater than the likelihood that the second token is the delimiter, step 224 presents the parsing results 128 (see FIG. 1) of the first parser without needing to generate and present the result of parsing the sample log 112 (see FIG. 1) by using the second parser.

Matching to a Timestamp Format

Figure 3:
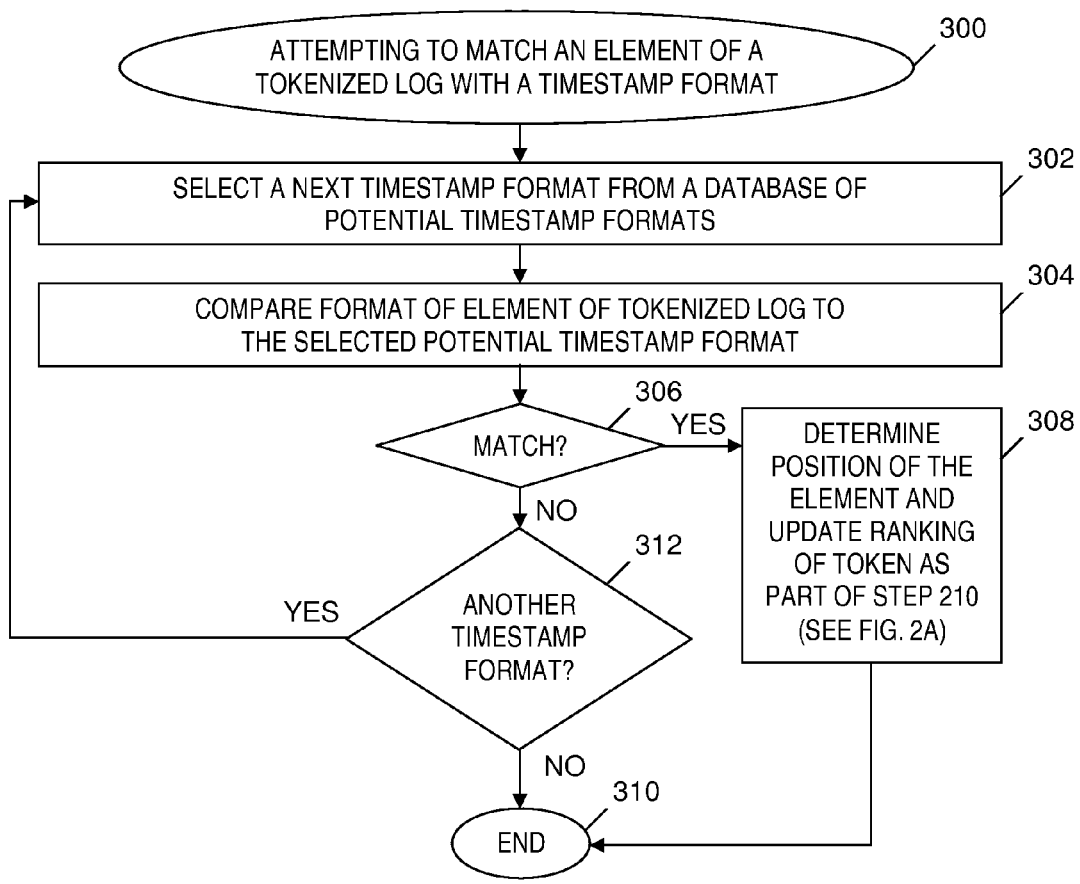
FIG. 3 is a flowchart of a process of attempting to match an element of a tokenized log to a timestamp format, where the process is included in the process of FIGS. 2A-2B, in accordance with embodiments of the present invention.

FIG. 3 is a flowchart of a process of attempting to match an element of a tokenized log to a timestamp format, where the process is included in the process of FIGS. 2A-2B, in accordance with embodiments of the present invention. The process of attempting to match an element of a tokenized log to a timestamp format begins at step 300. In step 302, data collection and token ranking module 106 (see FIG. 1) selects a timestamp format from a plurality of timestamp formats stored in timestamp format database 116 (see FIG. 1). Hereinafter in the discussion of FIG. 3, the timestamp format selected in step 302 is also referred to as "the selected timestamp format." Each of the timestamp formats in timestamp format database 116 (see FIG. 1) is a potential timestamp format because each is potentially the format of the element of the tokenized log.

In step 304, data collection and token ranking module 106 (see FIG. 1) compares the format of an element of the tokenized log (i.e., the tokenized log generated in the most recent performance of step 206 (see FIG. 2A)) to the timestamp format selected in step 302.

In step 306, based on the comparison in step 304, data collection and token ranking module 106 (see FIG. 1) determines whether the format of the element of the tokenized log matches the selected timestamp format. If data collection and token ranking module 106 (see FIG. 1) determines in step 306 that the format of the element matches the selected timestamp format, then the Yes branch of step 306 is taken and step 308 is performed.

In step 308, data collection and token ranking module 106 (see FIG. 1) determines the position of the element and updates the ranking of the token as part of step 210 (see FIG. 2A). The determination of the position and the update of the ranking are described above relative to step 210 (see FIG. 2A). The process of FIG. 3 ends at step 310.

Returning to step 306, if data collection and token ranking module 106 (see FIG. 1) determines that the format of the element does not match the selected timestamp format, then the No branch of step 306 is taken and step 312 is performed.

If data collection and token ranking module 106 (see FIG. 1) determines in step 312 that there is another potential timestamp format in timestamp format database 116 (see FIG. 1) that has not yet been selected in step 302, then the Yes branch of step 312 is taken and the process of FIG. 3 loops back to an iteration of step 302, with data collection and token ranking module 106 (see FIG. 1) selecting a next timestamp format from timestamp format database 116 (see FIG. 1).

In one embodiment, the first and iterative performances of step 302 select timestamp formats from timestamp format database 116 (see FIG. 1) in a specified order, starting with the most precise timestamp format and selecting the next most precise timestamp format in the subsequent performance(s) of step 302. In one embodiment, a first timestamp format is more precise than a second timestamp format if the number of characters in the pattern specifying the first timestamp format is greater than the number of characters in the pattern specifying the second timestamp format. For example, a first timestamp format specified by YYYY/MM/DD HH:MM:SS Z is more precise than a second timestamp format specified by MM/DD/YY because YYYY/MM/DD HH:MM:SS Z has more characters than MM/DD/YY.

Returning to step 312, if data collection and token ranking module 106 (see FIG. 1) determines that all of the timestamp formats in the plurality of potential timestamp formats stored in timestamp format database 116 (see FIG. 1) have been selected in step 302, then the No branch of step 312 is taken and the process of FIG. 3 ends at step 310.

In one embodiment, steps 302, 304, 306 and 312 are included in step 208 (see FIG. 2A), and step 308 is included in step 210 (see FIG. 2A).

Matching to a Field Name

Figure 4:
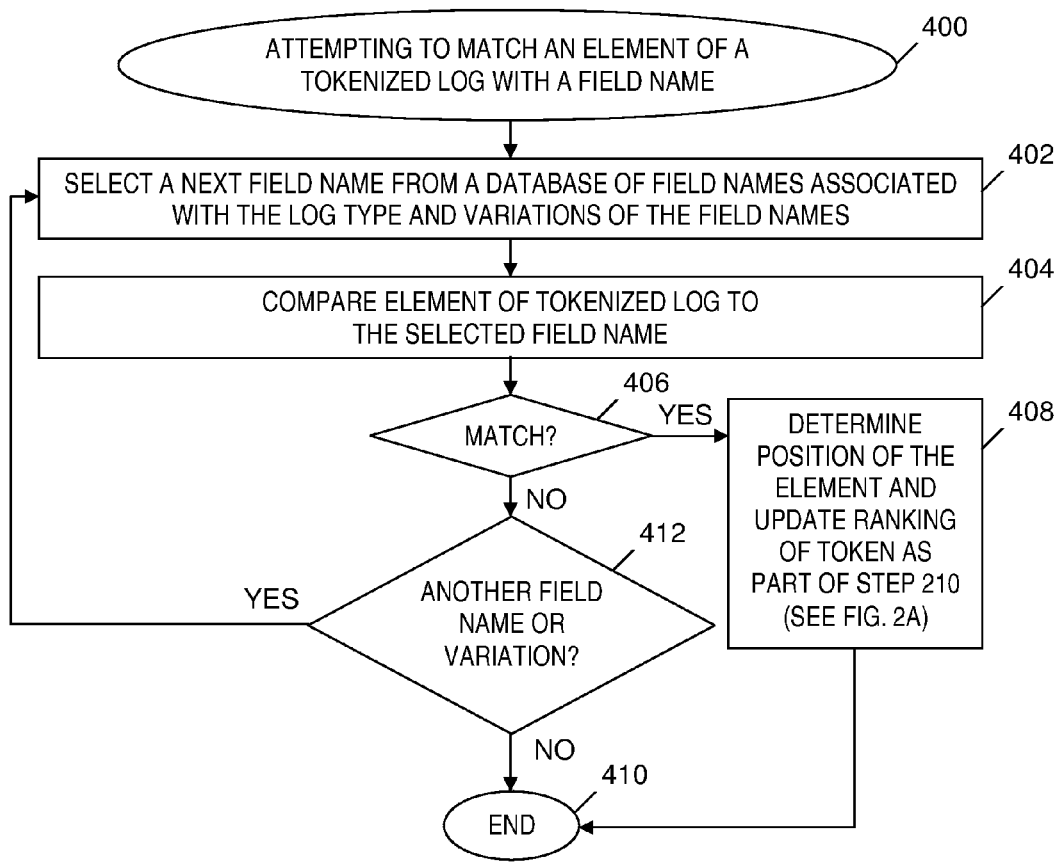
FIG. 4 is a flowchart of a process of attempting to match an element of a tokenized log to a field name, where the process is included in the process of FIGS. 2A-2B, in accordance with embodiments of the present invention.

FIG. 4 is a flowchart of a process of attempting to match an element of a tokenized log to a field name, where the process is included in the process of FIGS. 2A-2B, in accordance with embodiments of the present invention. The process of attempting to match an element of a tokenized log to a field name begins at step 400. In step 402, data collection and token ranking module 106 (see FIG. 1) selects a field name from a plurality of field names stored in field name database 118 (see FIG. 1). For example, the plurality of field names may include event_name, timestamp, src_ip and dst_ip. Hereinafter in the discussion of FIG. 4, the field name selected in step 402 is also referred to as "the selected field name."

In one embodiment, the plurality of field names are stored in field name database 118 (see FIG. 1) so as to be associated with the log type received in step 202 (see FIG. 2A).

In step 404, data collection and token ranking module 106 (see FIG. 1) compares an element of the tokenized log (i.e., the tokenized log generated in the most recent performance of step 206 (see FIG. 2A)) to the selected field name and to variations of the selected field name. In one embodiment, data collection and token ranking module 106 (see FIG. 1)

retrieves the variations of the selected field name from field name database 118 (see FIG. 1). In another embodiment, data collection and token ranking module 106 (see FIG. 1) determines the variations of the selected field name by applying predefined rules in step 404 to convert the selected field name into one or more variations of the selected field name.

For example, if the selected field name is eventName, then variations of eventName that are retrieved or generated in step 404 may be "event name" and "event."

In step 406, based on the comparison(s) in step 404, data collection and token ranking module 106 (see FIG. 1) determines whether the element of the tokenized log matches the selected field name or a variation of the selected field name. If data collection and token ranking module 106 (see FIG. 1) determines in step 406 that the element matches the selected field name or variation of the selected field name, then the Yes branch of step 406 is taken and step 408 is performed.

In step 408, data collection and token ranking module 106 (see FIG. 1) determines the position of the element and updates the ranking of the token as part of step 210 (see FIG. 2A). The determination of the position and the update of the ranking are described above relative to step 210 (see FIG. 2A). The process of FIG. 4 ends at step 410.

Returning to step 406, if data collection and token ranking module 106 (see FIG. 1) determines that the element does not match the selected field name or a variation of the selected field name, then the No branch of step 406 is taken and step 412 is performed.

If data collection and token ranking module 106 (see FIG. 1) determines in step 412 that there is another field name in field name database 118 (see FIG. 1) that has not yet been selected in step 402, then the Yes branch of step 412 is taken and the process of FIG. 4 loops back to an iteration of step 402, with data collection and token ranking module 106 (see FIG. 1) selecting a next field name from field name database 118 (see FIG. 1).

Returning to step 412, if data collection and token ranking module 106 (see FIG. 1) determines that all of the field names in the plurality of field names stored in field name database 118 (see FIG. 1) have been selected in iterations of step 402, then the No branch of step 412 is taken and the process of FIG. 4 ends at step 410.

In one embodiment, steps 402, 404, 406 and 412 are included in step 208 (see FIG. 2A), and step 408 is included in step 210 (see FIG. 2A).

Matching to a Field Value

Figure 5:
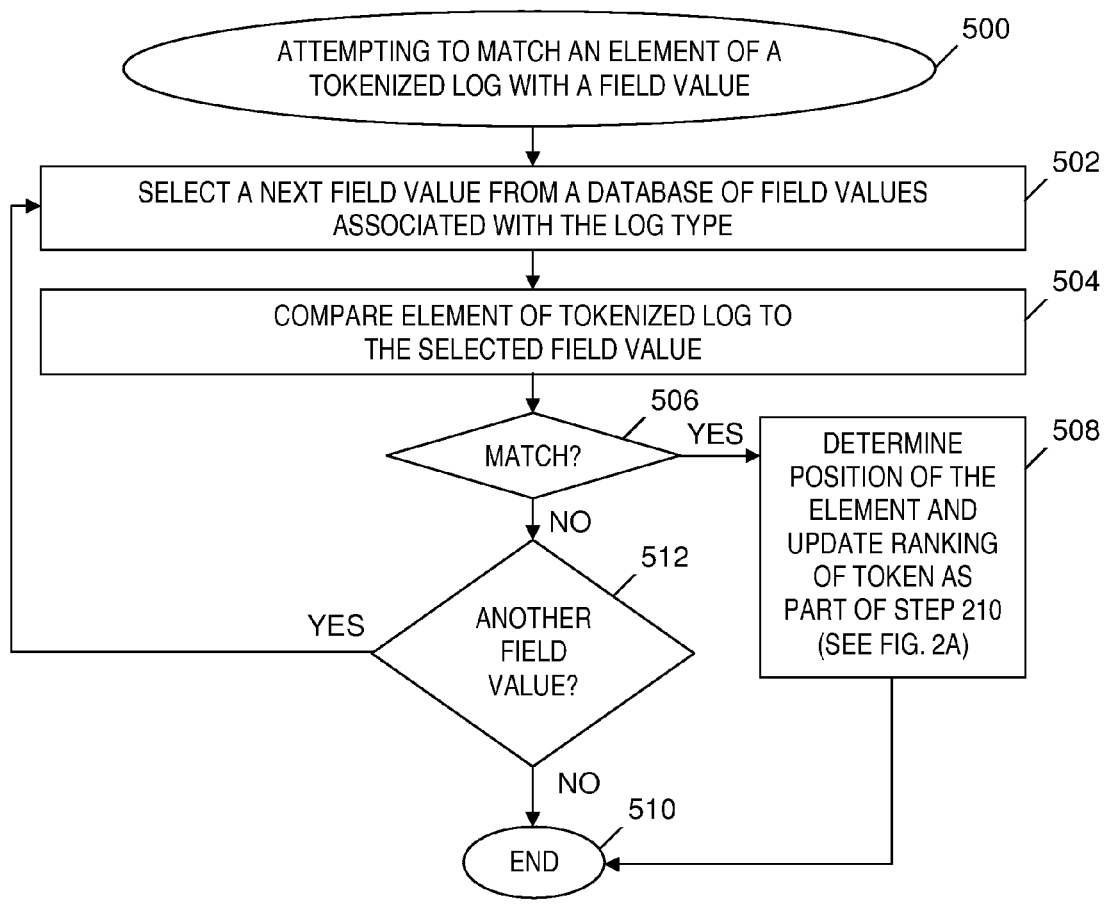
FIG. 5 is a flowchart of a process of attempting to match an element of a tokenized log to a field value, where the process is included in the process of FIGS. 2A-2B, in accordance with embodiments of the present invention.

FIG. 5 is a flowchart of a process of attempting to match an element of a tokenized log to a field value, where the process is included in the process of FIGS. 2A-2B, in accordance with embodiments of the present invention. The process of attempting to match an element of a tokenized log to a field value begins at step 500. In step 502, data collection and token ranking module 106 (see FIG. 1) selects a field value from a plurality of field values stored in value database 120 (see FIG. 1). For example, the plurality of field values in value database 120 (see FIG. 1) are a list of event names, ports, actions, etc. that are specified prior to the start of the process of FIG. 5 Hereinafter in the discussion of FIG. 5, the field value selected in step 502 is also referred to as "the selected field value."

In one embodiment, the plurality of field values are stored in value database 120 (see FIG. 1) so as to be associated with the log type received in step 202 (see FIG. 2A).

In step 504, data collection and token ranking module 106 (see FIG. 1) compares an element of the tokenized log (i.e., the tokenized log generated in the most recent performance of step 206 (see FIG. 2A)) to the selected field value.

In step 506, based on the comparison in step 504, data collection and token ranking module 106 (see FIG. 1) determines whether the element of the tokenized log matches the selected field value. If data collection and token ranking module 106 (see FIG. 1) determines in step 506 that the element matches the selected field value, then the Yes branch of step 506 is taken and step 508 is performed.

In step 508, data collection and token ranking module 106 (see FIG. 1) determines the position of the element and updates the ranking of the token as part of step 210 (see FIG. 2A). The determination of the position and the update of the ranking are described above relative to step 210 (see FIG. 2A). The process of FIG. 5 ends at step 510.

Returning to step 506, if data collection and token ranking module 106 (see FIG. 1) determines that the element does not match the selected field value, then the No branch of step 506 is taken and step 512 is performed.

If data collection and token ranking module 106 (see FIG. 1) determines in step 512 that there is another field value in value database 120 (see FIG. 1) that has not yet been selected in step 502, then the Yes branch of step 512 is taken and the process of FIG. 5 loops back to an iteration of step 502, with data collection and token ranking module 106 (see FIG. 1) selecting a next field value from value database 120 (see FIG. 1).

Returning to step 512, if data collection and token ranking module 106 (see FIG. 1) determines that all of the field values in the plurality of field values stored in value database 120 (see FIG. 1) have been selected in iterations of step 502, then the No branch of step 512 is taken and the process of FIG. 5 ends at step 510.

In one embodiment, steps 502, 504, 506 and 512 are included in step 208 (see FIG. 2A), and step 508 is included in step 210 (see FIG. 2A).

Matching to a Value Pattern

Figure 6:
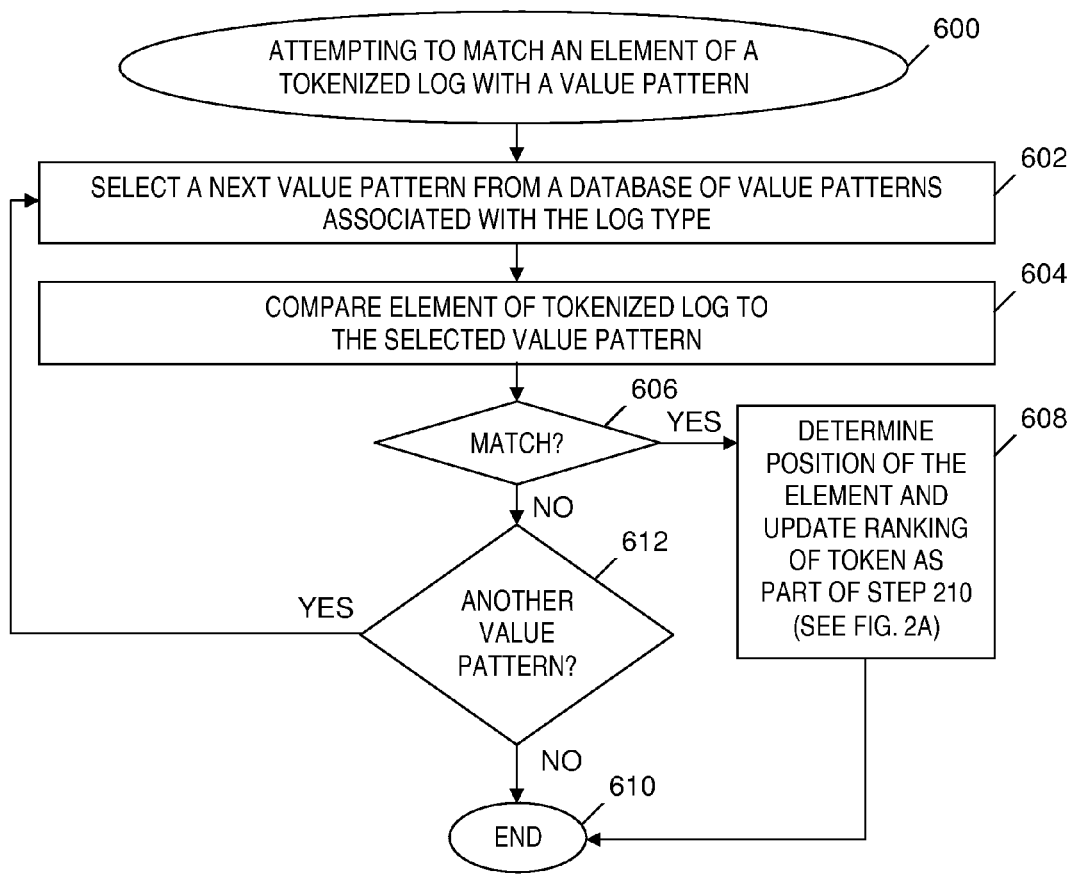
FIG. 6 is a flowchart of a process of attempting to match an element of a tokenized log to a value pattern, where the process is included in the process of FIGS. 2A-2B, in accordance with embodiments of the present invention.

FIG. 6 is a flowchart of a process of attempting to match an element of a tokenized log to a value pattern, where the process is included in the process of FIGS. 2A-2B, in accordance with embodiments of the present invention. The process of attempting to match an element of a tokenized log to a value pattern begins at step 600. In step 602, data collection and token ranking module 106 (see FIG. 1) selects a value pattern from a plurality of value patterns stored in value pattern database 122 (see FIG. 1). For example, the plurality of value patterns may include value patterns for Internet Protocol (IP) addresses, currency, ports, etc., which are specified prior to the start of the process of FIG. 6. Hereinafter in the discussion of FIG. 6, the value pattern selected in step 602 is also referred to as "the selected value pattern."

In one embodiment, the plurality of value patterns are stored in value pattern database 122 (see FIG. 1) so as to be associated with the log type received in step 202 (see FIG. 2A).

In step 604, data collection and token ranking module 106 (see FIG. 1) compares an element of the tokenized log (i.e., the tokenized log generated in the most recent performance of step 206 (see FIG. 2A)) to the selected value pattern.

In step 606, based on the comparison in step 604, data collection and token ranking module 106 (see FIG. 1) determines whether the element of the tokenized log matches the selected value pattern. If data collection and token ranking module 106 (see FIG. 1) determines in step 606 that the element matches the selected value pattern, then the Yes branch of step 606 is taken and step 608 is performed.

In step 608, data collection and token ranking module 106 (see FIG. 1) determines the position of the element and updates the ranking of the token as part of step 210 (see FIG.

2A). The determination of the position and the update of the ranking are described above relative to step 210 (see FIG. 2A). The process of FIG. 6 ends at step 610.

Returning to step 606, if data collection and token ranking module 106 (see FIG. 1) determines that the element does not match the selected value pattern, then the No branch of step 606 is taken and step 612 is performed.

If data collection and token ranking module 106 (see FIG. 1) determines in step 612 that there is another value pattern in value pattern database 122 (see FIG. 1) that has not yet been selected in step 602, then the Yes branch of step 612 is taken and the process of FIG. 6 loops back to an iteration of step 602, with data collection and token ranking module 106 (see FIG. 1) selecting a next value pattern from value pattern database 122 (see FIG. 1).

Returning to step 612, if data collection and token ranking module 106 (see FIG. 1) determines that all of the value patterns in the plurality of value patterns in value pattern database 122 (see FIG. 1) have been selected in iterations of step 602, then the No branch of step 612 is taken and the process of FIG. 6 ends at step 610.

In one embodiment, steps 602, 604, 606 and 612 are included in step 208 (see FIG. 2A), and step 608 is included in step 210 (see FIG. 2A).

Sample Data Structure

Given the sample log: 12/12/2011 15:32:34 EST, eventName=Javascript_Noop_Sled, sourceIp=1.2.3.4, destinationIp=4.3.2.5, port5123, an example of data structure 124 (see FIG. 1) generated by data collection and token ranking module 106 (see FIG. 1) is presented below:

[
{
  token: '|',
  rank: 15,
  timestamp: {format: "MM/DD/YYYY HH:MM:SS Z",
    token_position: 0},
  field_matches: [
    {field: "event_name", permutation: "eventName",
      token_position: 3, separator_token: "="},
    {field: "src_ip", permutation: "sourceIp", token_position: 4, separator_token: "="},
    {field: "dst_ip", permutation: "destinationIp", token_position: 5, separator_token: "="}
  ],
  value_matches: [
    {field: "event_name", permutation: "TCP_Port_Scan", token_position: 3}
  ],
  value_pattern_matches: [
    {field: "src_ip", pattern: "^([01]?\\d\\d?|2[0-4]\\d|25[0-5])\\.([01]?\\d\\d?|2[0-4]\\d|25[0-5])\\. ([01]?\\d\\d?|2[0-4]\\d|25[0-5])\\.([01]?\\d\\d?|2[0-4]\\d|25[0-5])$", token_position: 4},
    {field: "dst_ip", pattern: "^([01]?\\d\\d?|2[0-4]\\d|25[0-5])\\.([01]?\\d\\d?|2[0-4]\\d|25[0-5])\\. ([01]?\\d\\d?|2[0-4]\\d|25[0-5])\\.([01]?\\d\\d?|2[0-4]\\d|25[0-5])$", token_position: 5},
  ]
},
{
  token: ';',
  rank: 13,
  . . .
}
]

Sample Parsing Results

An example of parsing results 128 (see FIG. 1) presented by validation module 110 (see FIG. 1) is the data table presented below:

| timestamp | event_name | src_ip | dst_ip | port |
|---|---|---|---|---|
| 12/12/2011 15:32:34 EST | Javascript_Noop_Sled | 1.2.3.4 | 4.3.2.5 | <BLANK> |

Computer System

Figure 7:
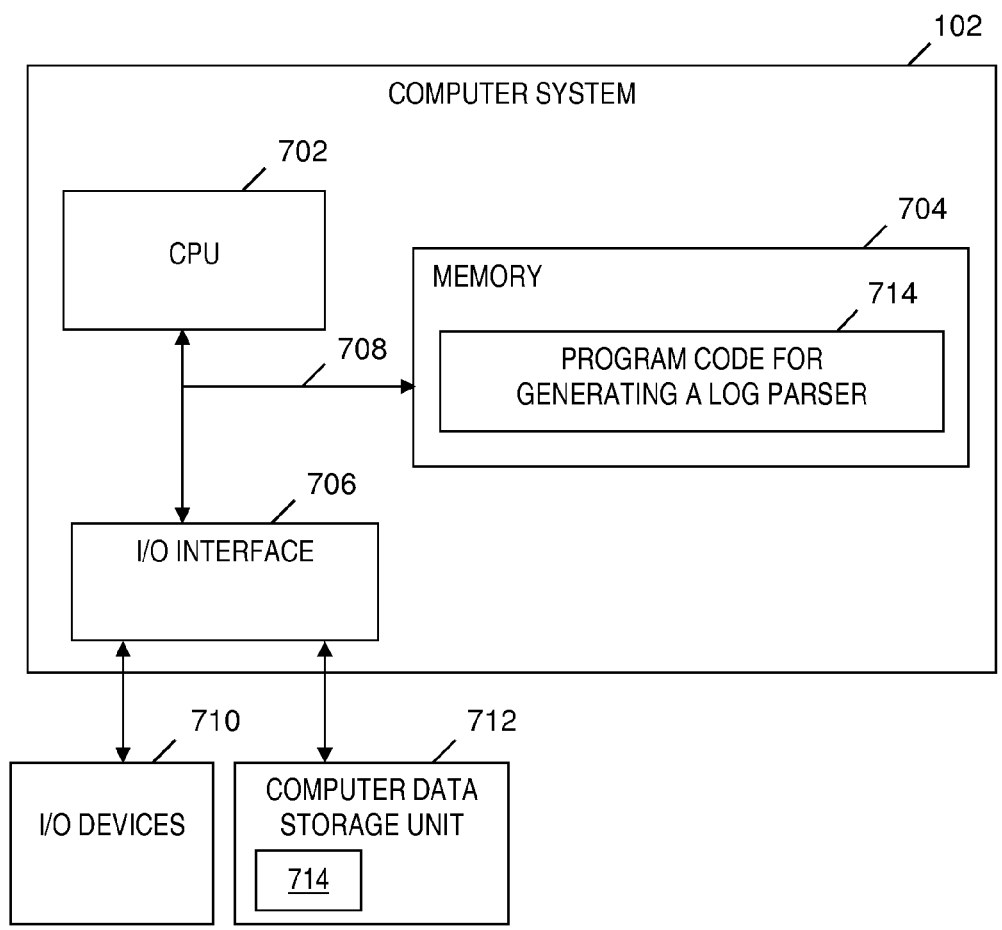
FIG. 7 is a block diagram of a computer system that is included in the system of FIG. 1 and that implements the process of FIGS. 2A-2B, in accordance with embodiments of the present invention.

FIG. 7 is a block diagram of a computer system that is included in the system of FIG. 1 and that implements the process of FIGS. 2A-2B, in accordance with embodiments of the present invention. Computer system 102 generally comprises a central processing unit (CPU) 702, a memory 704, an input/output (I/O) interface 706, and a bus 708. Further, computer system 102 is coupled to I/O devices 710 and a computer data storage unit 712. CPU 702 performs computation and control functions of computer system 102, including carrying out instructions included in program code 714 to perform a method of generating a log parser, where the instructions are carried out by CPU 702 via memory 704. CPU 702 may comprise a single processing unit, or be distributed across one or more processing units in one or more locations (e.g., on a client and server). In one embodiment, program code 714 includes code for log parser generator 104 (see FIG. 1). In one embodiment, program code 714 includes code for the modules 106, 108 and 110 (see FIG. 1).

Memory 704 may comprise any known computer-readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 102, and may comprise any type of transmission link, including electrical, optical, wireless, etc.

I/O interface 706 also allows computer system 102 to store information (e.g., data or program instructions such as program code 714) on and retrieve the information from computer data storage unit 712 or another computer data storage unit (not shown). Computer data storage unit 712 may comprise any known computer-readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are carried out by CPU 702 via memory 704 to generate a log parser. Although FIG. 7 depicts memory 704 as including program code 714, the present invention contemplates embodiments in which memory 704 does not include all of code 714 simultaneously, but instead at one time includes only a portion of code 714.

Further, memory 704 may include other systems not shown in FIG. 7, such as an operating system (e.g., Linux®) that runs on CPU 702 and provides control of various components within and/or connected to computer system 102. Linux is a registered trademark of Linus Torvalds in the United States, other countries, or both.

Storage unit 712 and/or one or more other computer data storage units (not shown) that are coupled to computer system 102 may store token database 114 (see FIG. 1), timestamp format database 116, log type and field name database 118, value database 120 and/or value pattern database 122.

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 704 and/or computer data storage unit 712) having computer-readable program code (e.g., program code 714) embodied or stored thereon.

Any combination of one or more computer-readable mediums (e.g., memory 704 and computer data storage unit 712) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible storage device that can contain or store a program (e.g., program 714) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 714) embodied on a computer-readable medium may be transmitted using any appropriate medium, including but not limited to wireless, wireline, optical fiber cable, RF, etc., or any suitable combination of the foregoing.

Computer program code (e.g., program code 714) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714). These computer program instructions may be provided to one or more hardware processors (e.g., CPU 702) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 704 or computer data storage unit 712) that can direct a computer (e.g., computer system 102), other programmable data processing apparatus, or other devices to function in a particular manner, such that the instructions (e.g., program 714) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 714) which are carried out on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to generating a log parser. Thus, an embodiment of the present invention discloses a process for supporting computer infrastructure, wherein the process comprises a first computer system providing at least one support service for at least one of integrating, hosting, maintaining and deploying computer-readable code (e.g., program code 714) in a second computer system (e.g., computer system 102) comprising one or more processors (e.g., CPU 702), wherein the processor(s) carry out instructions contained in the code causing the second computer system to generate a log parser.

In another embodiment, the invention provides a method that performs the process steps of the invention on a subscription, advertising and/or fee basis. That is, a service provider, such as a Solution Integrator, can offer to create, maintain, support, etc. a process of generating a log parser. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2A-2B and the block diagrams in FIG. 1 and FIG. 7 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 714), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating a log parser, the method comprising the steps of:
    a computer receiving a sample log whose parts are delimited by one or more occurrences of a delimiter in the sample log;
    the computer retrieving a plurality of tokens;
    the computer generating a tokenized log by delimiting the received sample log based on a token included in the retrieved plurality of tokens, the tokenized log comprising a plurality of elements, each element delimited in the tokenized log by the token;
    the computer determining one or more matches between respective one or more elements in the plurality of elements and respective one or more attributes, each attribute being an attribute of a field included in one or more fields of the sample log;
    based on the one or more matches and based on the token, the computer determining one or more positions of the respective one or more elements within the tokenized log;
    based on the one or more matches, the computer determining a ranking of the token, the ranking indicating a first likelihood that the token is the delimiter that delimits the parts of the sample log;
    the computer determining a second ranking of another token included in the retrieved plurality of tokens, the second ranking indicating a second likelihood that the other token is the delimiter;
    the computer determining the first likelihood is greater than the second likelihood;
    based on the one or more positions, the one or more matches, and the token, the computer generating a first parser by generating one or more parser patterns for the one or more matches, respectively;
    the computer generating a second parser based in part on the other token;
    the computer parsing the sample log based on the generated first parser; and
    based on the first likelihood being greater than the second likelihood, the computer presenting a result of the step of parsing the sample log and the computer receiving a validation of the presented result without the computer presenting another result of parsing the sample log based on the second parser.

2. The method of claim 1, further comprising the steps of:
    the computer selecting a format of a timestamp in the sample log from a plurality of potential formats of the timestamp, the selected format of the timestamp being an attribute included in the one or more attributes;
    the computer determining a match between an element in the plurality of elements included in the tokenized log and the selected format of the timestamp; and
    based on the match between the element and the selected format of the timestamp and based on the token, the computer determining a position of the element within the tokenized log,
    wherein the step of determining the ranking of the token is further based on the match between the element and the selected format of the timestamp, and
    wherein the step of generating the first parser includes a step of generating a parser pattern for the timestamp based on the token, the position and the selected format of the timestamp.

3. The method of claim 1, wherein each attribute of the field is selected from the group consisting of a name of the field, a value of the field, and a value pattern specifying a pattern of any value in the field.

4. The method of claim 1, further comprising the steps of:
    the computer receiving a type of the sample log;
    based on the received type of the sample log, the computer receiving a plurality of names of fields;
    the computer selecting a name of the field from the received plurality of names of fields, the selected name of the field being an attribute included in the one or more attributes;
    the computer determining a match between an element in the plurality of elements and the selected name of the field;

based on the match between the element and the selected name of the field, the computer determining a position of the element within the tokenized log; and based on the match between the element and the selected name of the token, the computer updating the ranking of the token, wherein the step of generating the first parser is based in part on the position of the element within the tokenized log.

5. The method of claim 1, further comprising the steps of:

the computer receiving a type of the sample log;

based on the received type of the sample log, the computer receiving a plurality of values of fields;

the computer selecting a value of a field from the received plurality of values of fields, the selected value of the field being an attribute included in the one or more attributes;

the computer determining a match between an element in the plurality of elements and the selected value of the field;

based on the match between the element and the selected value of the field, the computer determining a position of the element within the tokenized log; and based on the match between the element and the selected value of the field, the computer updating the ranking of the token, wherein the step of generating the first parser is based in part on the position of the element within the tokenized log.

6. The method of claim 1, further comprising the steps of:

the computer receiving a type of the sample log;

based on the received type of the sample log, the computer receiving a plurality of value patterns for values of fields;

the computer selecting a value pattern from the received plurality of value patterns, the selected value pattern being an attribute included in the one or more attributes;

the computer determining a match between an element in the plurality of elements and the selected value pattern;

based on the match between the element and the selected value pattern, the computer determining a position of the element within the tokenized log; and based on the match between the element and the selected value pattern, the computer updating the ranking of the token, wherein the step of generating the first parser is based in part on the position of the element within the tokenized log.

7. The method of claim 1, further comprising the steps of:

the computer receiving a type of the sample log;

based on the received type of the sample log, the computer receiving a plurality of names of fields and a plurality of value patterns for values of the fields;

the computer selecting a name of a field from the plurality of names of fields, the selected name of the field being an attribute included in the one or more attributes;

the computer determining a match between an element in the plurality of elements and the selected name of the field; and based on the match between the element and the selected name of the field, the computer determining a position of the element within the tokenized log, wherein the step of generating the first parser includes:

based on the token, the position and the selected name of the field, the computer generating a parser pattern specifying a pattern of the field, without requiring a determination of the element matching a value pattern selected from the plurality of value patterns.

8. The method of claim 1, further comprising the steps of:

the computer receiving a type of the sample log;

based on the received type of the sample log, the computer receiving a plurality of names of fields and a plurality of value patterns for values of the fields;

the computer determining that no match exists between an element in the plurality of elements and any name in the received plurality of names of fields;

the computer selecting a value pattern from the plurality of value patterns, the selected value pattern being an attribute included in the one or more attributes;

the computer determining a match between the element and the selected value pattern;

based on the match between the element and the selected value pattern, the computer determining a position of the element within the tokenized log, wherein the step of generating the first parser includes:

based on the token, the position and the selected value pattern, and not based on any name included in the plurality of names of fields, the computer generating a parser pattern specifying a pattern of the field.

9. A computer system comprising:

a central processing unit (CPU);

a memory coupled to the CPU;

a computer-readable, tangible storage device coupled to the CPU, the storage device containing instructions that, when carried out by the CPU via the memory, implement a method of generating a log parser, the method comprising the steps of:

the computer system receiving a sample log whose parts are delimited by one or more occurrences of a delimiter in the sample log;

the computer system retrieving a plurality of tokens;

the computer system generating a tokenized log by delimiting the received sample log based on a token included in the retrieved plurality of tokens, the tokenized log comprising a plurality of elements, each element delimited in the tokenized log by the token;

the computer system determining one or more matches between respective one or more elements in the plurality of elements and respective one or more attributes, each attribute being an attribute of a field included in one or more fields of the sample log;

based on the one or more matches and based on the token, the computer system determining one or more positions of the respective one or more elements within the tokenized log;

based on the one or more matches, the computer system determining a ranking of the token, the ranking indicating a first likelihood that the token is the delimiter that delimits the parts of the sample log;

the computer system determining a second ranking of another token included in the retrieved plurality of tokens, the second ranking indicating a second likelihood that the other token is the delimiter;

the computer system determining the first likelihood is greater than the second likelihood;

based on the one or more positions, the one or more matches, and the token, the computer system generating a first parser by generating one or more parser patterns for the one or more matches, respectively;

the computer system generating a second parser based in part on the other token;

the computer system parsing the sample log based on the generated first parser; and based on the first likelihood being greater than the second likelihood, the computer system presenting a result of the step of parsing the sample log and the computer system receiving a validation of the presented result without the computer system presenting another result of parsing the sample log based on the second parser.

10. The computer system of claim 9, wherein the method further comprises the steps of:
the computer system selecting a format of a timestamp in the sample log from a plurality of potential formats of the timestamp, the selected format of the timestamp being an attribute included in the one or more attributes;
the computer system determining a match between an element in the plurality of elements included in the tokenized log and the selected format of the timestamp; and
based on the match between the element and the selected format of the timestamp and based on the token, the computer system determining a position of the element within the tokenized log,
wherein the step of determining the ranking of the token is further based on the match between the element and the selected format of the timestamp, and
wherein the step of generating the first parser includes a step of generating a parser pattern for the timestamp based on the token, the position and the selected format of the timestamp.

11. The computer system of claim 9, wherein each attribute of the field is selected from the group consisting of a name of the field, a value of the field, and a value pattern specifying a pattern of any value in the field.

12. The computer system of claim 9, wherein the method further comprises the steps of:
the computer system receiving a type of the sample log;
based on the received type of the sample log, the computer system receiving a plurality of names of fields;
the computer system selecting a name of a field from the received plurality of names of fields, the selected name of the field being an attribute included in the one or more attributes;
the computer system determining a match between an element in the plurality of elements and the selected name of the field;
based on the match between the element and the selected name of the field, the computer system determining a position of the element within the tokenized log; and
based on the match between the element and the selected name of the field, the computer system updating the ranking of the token, wherein the step of generating the first parser is based in part on the position of the element within the tokenized log.

13. The computer system of claim 9, wherein the method further comprises the steps of:
the computer system receiving a type of the sample log;
based on the received type of the sample log, the computer system receiving a plurality of values of fields;
the computer system selecting a value of a field from the received plurality of values of fields, the selected value of the field being an attribute included in the one or more attributes;
the computer system determining a match between an element in the plurality of elements and the selected value of the field;
based on the match between the element and the selected value of the field, the computer system determining a position of the element within the tokenized log; and
based on the match between the element and the selected value of the field, the computer system updating the ranking of the token, wherein the step of generating the first parser is based in part on the position of the element within the tokenized log.

14. The computer system of claim 9, wherein the method further comprises the steps of:
the computer system receiving a type of the sample log;
based on the received type of the sample log, the computer system receiving a plurality of value patterns for values of fields;
the computer system selecting a value pattern from the received plurality of value patterns, the selected value pattern being an attribute included in the one or more attributes;
the computer system determining a match between an element in the plurality of elements and the selected value pattern;
based on the match between the element and the selected value pattern, the computer system determining a position of the element within the tokenized log; and
based on the match between the element and the selected value pattern, the computer system updating the ranking of the token, wherein the step of generating the first parser is based in part on the position of the element within the tokenized log.

15. The computer system of claim 9, wherein the method further comprises the steps of:
the computer system receiving a type of the sample log;
based on the received type of the sample log, the computer system receiving a plurality of names of fields and a plurality of value patterns for values of the fields;
the computer system selecting a name of a field from the plurality of names of fields, the selected name of the field being an attribute included in the one or more attributes;
the computer system determining a match between an element in the plurality of elements and the selected name of the field; and
based on the match between the element and the selected name of the field, the computer system determining a position of the element within the tokenized log, wherein the step of generating the first parser includes:
based on the token, the position and the selected name of the field, the computer system generating a parser pattern specifying a pattern of the field, without requiring a determination of the element matching a value pattern selected from the plurality of value patterns.

16. The computer system of claim 9, wherein the method further comprises the steps of:
the computer system receiving a type of the sample log;
based on the received type of the sample log, the computer system receiving a plurality of names of fields and a plurality of value patterns for values of the fields;
the computer system determining that no match exists between an element in the plurality of elements and any name in the received plurality of names of fields;
the computer system selecting a value pattern from the plurality of value patterns, the selected value pattern being an attribute included in the one or more attributes;
the computer system determining a match between the element and the selected value pattern;
based on the match between the element and the selected value pattern, the computer system determining a position of the element within the tokenized log, wherein the step of generating the first parser includes:
based on the token, the position and the selected value pattern, and not based on any name included in the plurality of names of fields, the computer system generating a parser pattern specifying a pattern of the field.

17. A computer program product comprising:
a computer-readable, tangible storage device; and
computer-readable program instructions stored in the computer-readable, tangible storage device, the computer-readable program instructions, when carried out by a central processing unit (CPU) of a computer system, implement a method of generating a log parser, the method comprising the steps of:
the computer system receiving a sample log whose parts are delimited by one or more occurrences of a delimiter in the sample log;
the computer system retrieving a plurality of tokens;
the computer system generating a tokenized log by delimiting the received sample log based on a token included in the retrieved plurality of tokens, the tokenized log comprising a plurality of elements, each element delimited in the tokenized log by the token;
the computer system determining one or more matches between respective one or more elements in the plurality of elements and respective one or more attributes, each attribute being an attribute of a field included in one or more fields of the sample log;
based on the one or more matches and based on the token, the computer system determining one or more positions of the respective one or more elements within the tokenized log;
based on the one or more matches, the computer system determining a ranking of the token, the ranking indicating a first likelihood that the token is the delimiter that delimits the parts of the sample log;
the computer system determining a second ranking of another token included in the retrieved plurality of tokens, the second ranking indicating a second likelihood that the other token is the delimiter;
the computer system determining the first likelihood is greater than the second likelihood;
based on the one or more positions, the one or more matches, and the token, the computer system generating a first parser by generating one or more parser patterns for the one or more matches, respectively;
the computer system generating a second parser based in part on the other token;
the computer system parsing the sample log based on the generated first parser; and
based on the first likelihood being greater than the second likelihood, the computer system presenting a result of the step of parsing the sample log and the computer system receiving a validation of the presented result without the computer system presenting another result of parsing the sample log based on the second parser.

18. The program product of claim 17, wherein the method further comprises the steps of:
the computer system selecting a format of a timestamp in the sample log from a plurality of potential formats of the timestamp, the selected format of the timestamp being an attribute included in the one or more attributes;
the computer system determining a match between an element in the plurality of elements included in the tokenized log and the selected format of the timestamp; and
based on the match between the element and the selected format of the timestamp and based on the token, the computer system determining a position of the element within the tokenized log,
wherein the step of determining the ranking of the token is further based on the match between the element and the selected format of the timestamp, and
wherein the step of generating the first parser includes a step of generating a parser pattern for the timestamp based on the token, the position and the selected format of the timestamp.

19. The program product of claim 17, wherein each attribute of the field is selected from the group consisting of a name of the field, a value of the field, and a value pattern specifying a pattern of any value in the field.

20. The program product of claim 17, wherein the method further comprises the steps of:
the computer system receiving a type of the sample log;
based on the received type of the sample log, the computer system receiving a plurality of names of fields;
the computer system selecting a name of a field from the received plurality of names of fields, the selected name of the field being an attribute included in the one or more attributes;
the computer system determining a match between an element in the plurality of elements and the selected name of the field;
based on the match between the element and the selected name of the field, the computer system determining a position of the element within the tokenized log; and
based on the match between the element and the selected name of the field, the computer system updating the ranking of the token, wherein the step of generating the first parser is based in part on the position of the element within the tokenized log.

21. The program product of claim 17, wherein the method further comprises the steps of:
the computer system receiving a type of the sample log;
based on the received type of the sample log, the computer system receiving a plurality of values of fields;
the computer system selecting a value of a field from the received plurality of values of fields, the selected value of the field being an attribute included in the one or more attributes;
the computer system determining a match between an element in the plurality of elements and the selected value of the field;
based on the match between the element and the selected value of the field, the computer system determining a position of the element within the tokenized log; and
based on the match between the element and the selected value of the field, the computer system updating the ranking of the token, wherein the step of generating the first parser is based in part on the position of the element within the tokenized log.

22. The program product of claim 17, wherein the method further comprises the steps of:
the computer system receiving a type of the sample log;
based on the received type of the sample log, the computer system receiving a plurality of value patterns for values of fields;
the computer system selecting a value pattern from the received plurality of value patterns, the selected value pattern being an attribute included in the one or more attributes;
the computer system determining a match between an element in the plurality of elements and the selected value pattern;
based on the match between the element and the selected value pattern, the computer system determining a position of the element within the tokenized log; and based on the match between the element and the selected value pattern, the computer system updating the ranking of the token, wherein the step of generating the first parser is based in part on the position of the element within the tokenized log.

23. A process for supporting computing infrastructure, the process comprising:
   a first computer system providing at least one support service for at least one of creating, integrating, hosting, maintaining, and deploying computer-readable code in a second computer system, the computer-readable code containing instructions, wherein the instructions, when carried out by a processor of the second computer system, implement a method of generating a log parser, the method comprising the steps of:
      the second computer system receiving a sample log whose parts are delimited by one or more occurrences of a delimiter in the sample log;
   the second computer system retrieving a plurality of tokens;
      the second computer system generating a tokenized log by delimiting the received sample log based on a token included in the retrieved plurality of tokens, the tokenized log comprising a plurality of elements, each element delimited in the tokenized log by the token;
      the second computer system determining one or more matches between respective one or more elements in the plurality of elements and respective one or more attributes, each attribute being an attribute of a field included in one or more fields of the sample log;
      based on the one or more matches and based on the token, the second computer system determining one or more positions of the respective one or more elements within the tokenized log;
      based on the one or more matches, the second computer system determining a ranking of the token, the ranking indicating a first likelihood that the token is the delimiter that delimits the parts of the sample log;
      the second computer system determining a second ranking of another token included in the retrieved plurality of tokens, the second ranking indicating a second likelihood that the other token is the delimiter;
      the second computer system determining the first likelihood is greater than the second likelihood;
      based on the one or more positions, the one or more matches, and the token, the second computer system generating a first parser by generating one or more parser patterns for the one or more matches, respectively;
      the second computer system generating a second parser based in part on the other token;
      the second computer system parsing the sample log based on the generated first parser; and
      based on the first likelihood being greater than the second likelihood, the second computer system presenting a result of the step of parsing the sample log and the second computer system receiving a validation of the presented result without the second computer system presenting another result of parsing the sample log based on the second parser.

24. The process of claim 23, wherein each attribute of the field is selected from the group consisting of a name of the field, a value of the field, and a value pattern specifying a pattern of any value in the field.

* * * * *